US010941927B1

(12) United States Patent
Yang et al.

(10) Patent No.: US 10,941,927 B1
(45) Date of Patent: Mar. 9, 2021

(54) GROW LIGHT

(71) Applicant: LONGHORN INTELLIGENT TECH CO., LTD, Shenzhen (CN)

(72) Inventors: Haitao Yang, Shenzhen (CN); Feng Zhu, Shenzhen (CN); Xingwei Huang, Shenzhen (CN); Zhiqing Zhu, Shenzhen (CN); Lin Yang, Shenzhen (CN)

(73) Assignee: LONGHORN INTELLIGENT TECH CO., LTD, Shenzhen (CN)

( * ) Notice: Subject to any disclaimer, the term of this patent is extended or adjusted under 35 U.S.C. 154(b) by 0 days.

(21) Appl. No.: 17/075,068

(22) Filed: Oct. 20, 2020

(51) Int. Cl.
| F21V 21/00 | (2006.01) |
| F21V 21/35 | (2006.01) |
| F21S 4/28 | (2016.01) |
| F21S 8/06 | (2006.01) |
| A01G 9/24 | (2006.01) |
| F21V 21/36 | (2006.01) |
| F21V 21/38 | (2006.01) |
| A01G 7/04 | (2006.01) |
| F21Y 115/10 | (2016.01) |
| F21W 131/109 | (2006.01) |
| F21Y 103/10 | (2016.01) |

(52) U.S. Cl.
CPC .............. *F21V 21/35* (2013.01); *A01G 7/045* (2013.01); *A01G 9/249* (2019.05); *F21S 4/28* (2016.01); *F21S 8/066* (2013.01); *F21V 21/36* (2013.01); *F21V 21/38* (2013.01); *F21W 2131/109* (2013.01); *F21Y 2103/10* (2016.08); *F21Y 2115/10* (2016.08)

(58) Field of Classification Search
CPC .......... F21V 21/36; F21V 21/35; F21V 21/38; F21S 4/28; F21S 8/066; F21Y 2103/10; A01G 7/045; A01G 9/249
USPC ......................................................... 362/648
See application file for complete search history.

(56) References Cited

U.S. PATENT DOCUMENTS

| 6,488,387 | B2 | 12/2002 | Wardenburg | |
| 8,523,385 | B2* | 9/2013 | Lu .......................... | H05B 47/19 362/231 |
| 10,111,392 | B2 | 10/2018 | Szeto | |
| 10,448,587 | B2* | 10/2019 | Dufresne ............... | A01G 31/02 |
| 10,517,231 | B2 | 12/2019 | Thosteson | |
| 10,842,082 | B1* | 11/2020 | Genga, Jr. .............. | A01G 7/045 |
| 2006/0032115 | A1* | 2/2006 | Van Den Dool ...... | A01G 7/045 47/17 |
| 2013/0263503 | A1* | 10/2013 | Bostdorff ................. | A01G 9/20 47/58.1 LS |
| 2013/0283683 | A1* | 10/2013 | Ringbom ............... | F21V 14/02 47/58.1 LS |
| 2015/0351325 | A1 | 12/2015 | Shelor | |

(Continued)

*Primary Examiner* — Laura K Tso
(74) *Attorney, Agent, or Firm* — Clement Cheng

(57) ABSTRACT

A grow light has a frame that includes a first frame rail and a second frame rail. The frame includes a first reflector. The first reflector extends from the first frame rail to the second frame rail. The frame has a second reflector. The second reflector extends from the first frame rail to the second frame rail. The frame has a right outside crossbar extending from the first frame rail to the second frame rail, and a left outside crossbar extending from the first frame rail to the second frame rail. Tube lights are elongated and extend from the frame. The tube lights have a vertical mode and a horizontal mode. The tube lights include a first tube light and a second tube light.

10 Claims, 10 Drawing Sheets

(56) References Cited

U.S. PATENT DOCUMENTS

| | | | |
|---|---|---|---|
| 2016/0192598 A1* | 7/2016 | Haggarty | H05B 35/00 |
| | | | 315/297 |
| 2016/0235014 A1* | 8/2016 | Donham | A01G 9/26 |
| 2017/0030565 A1* | 2/2017 | Powell | A01G 7/045 |
| 2017/0367273 A1* | 12/2017 | Bylsma | A01G 7/045 |
| 2019/0082611 A1* | 3/2019 | Speer | F21V 7/041 |
| 2020/0041109 A1* | 2/2020 | Van Der Schyf | F21V 21/30 |

* cited by examiner

GROW LIGHT

FIELD OF THE INVENTION

The present invention is in the field of portable grow lights.

DISCUSSION OF RELATED ART

A variety of different grow lights have horizontally oriented tubes as seen in the prior art. For example, in the U.S. Pat. No. 6,488,387, Adjustable height grow light by inventor Peter Wardenburg, published Dec. 3, 2002 the abstract discloses, "An adjustable height grow light for easy manual adjustment of the vertical position of the light fixture. The light includes a light stand having two vertical supports and a horizontal support connected to the vertical supports and defining an interior channel containing the operative elements of the light. Hanging from the vertical support is a light fixture adapted for holding at least one grow light. A ribbon torsion spring is secured within the interior channel of the horizontal support member on a ribbon spring axle. In series are first and second axles secured with the interior channel of the horizontal support, and first line and second lines are connected to the ribbon torsion spring at one end and to the light fixture at the other end. The first line is routed over the second axle and looped back to and over the first axle; the second line is routed over the second axle only. The ribbon torsion spring has a tension rating that permits easy manual positioning of the light fixture."

For example, in the U.S. Pat. No. 8,523,385, Compact high brightness LED grow light apparatus, using an extended point source LED array with light emitting diodes by inventor Junying Jonathan Lu et al., published Sep. 3, 2013 the abstract discloses, "The LED grow light fixture uses a densely-packed array of high-brightness LEDs that are not individually packaged where the array behaves similarly to a point source of light. The extended point source LED array, with its lens and associated reflector, result in a concentrated, partially-collimated light source, such that the intensity of the light does not diminish rapidly as distance from the light source increases. The LED array contains a plurality of LED strings that may be separately controlled, thereby allowing the spectral content of the LED grow light to be varied, to facilitate desired plant growth at various stages of plant life. The light emitted at each of the multiple different wavelengths from the array is evenly distributed, when the objects being illuminated by the array are at a distance of less than about 6 feet or even less than 1 foot from the array."

For example, in the United States publication number 2015/0351325 A1, Led grow light with automatic height adjustment by inventor F. Mack Shelor et al., published Dec. 10, 2015 the abstract discloses, "An efficient scalable networkable grow light system ensures that a DLI suitable for optimal plant growth without causing heat stress is met by selectively illuminating lighting elements of determined wavelengths, and adjusting intensity of the lighting elements, and adjusting the height of an assembly containing the lighting elements, if sensed ambient light is inadequate to meet the DLI. A hoist adjusts height to provide full illumination without causing heat stress, while reducing inefficiency due to excessive distance. If sensed ambient lighting is sufficient to meet the DLI, supplemental lighting is not activated."

For example, in the U.S. Pat. No. 10,111,392, Lighting System for Promoting the Rapid Maturation of Commercial Plants by inventor Oliver Szeto et al., published Oct. 30, 2018 the abstract discloses, A system and method for providing light to a plant with a life cycle that includes a seedling growth period, a vegetative growth period, and a flowering growth period. Illumination to the plant is provided with an array of LEDs that contains red LEDs, blue LEDs and white LEDs. During the seedling growth period, no red LEDs are illuminated. Blue and white LEDs are lit, wherein the blue light is more intense than the white. During the vegetative growth period, white and blue LEDs are lit, wherein the white light is more intense than the white. During the flowering growth period, red and white LEDs are lit, wherein the red light is more intense than the white light. The change in coloring and intensity has beneficial effects during each growth period and at the same time inhibits insects."

For example, in the U.S. Pat. No. 10,517,231, Vegetation grow light embodying power delivery and data communication features by inventor Eric Thosteson et al., published Dec. 31, 2019 the abstract discloses, "Embodiments of the invention relate to fixtures, systems and methods for providing vegetation grow light fixtures with auxiliary power and/or data communication ports or hubs allowing for expansion of their functionality, modularity and adaptability. The addition of power or communication ports integrated with a grow light fixture enables other components to be connected directly to and powered by the grow light fixture. Such components may include but are not limited to supplemental lighting, sensors and actuators."

SUMMARY OF THE INVENTION

A grow light has a frame. The frame includes a first frame rail and a second frame rail. The frame includes a first reflector. The first reflector extends from the first frame rail to the second frame rail. The frame has a second reflector. The second reflector extends from the first frame rail to the second frame rail. The frame has a right outside crossbar extending from the first frame rail to the second frame rail, and a left outside crossbar extending from the first frame rail to the second frame rail. Tube lights are elongated and extend from the frame. The tube lights have a vertical mode and a horizontal mode. The tube lights include a first tube light and a second tube light.

A power supply is mounted to the frame between the first frame rail and the second frame rail. A mains power line connects to the power supply. A suspension cable system is mounted to the frame at a suspension anchor, and mounted to an upper end of the first tube light at an upper connector. The tube lights have a lower end that is free when in vertical mode. The first frame rail folds at a first folding joint and the second frame rail folds at a second folding joint. Clips mounted to the frame retain the tube lights.

The first tube light is mounted underneath the first reflector. The second tube light is mounted underneath the first reflector. A third tube light is mounted underneath the second reflector. A fourth tube light is mounted underneath the third reflector.

The suspension cable system includes set of cables including a first cable, second cable, third cable, and fourth cable. The first cable and the second cable retain the first tube light when the first tube light is in the horizontal mode. The third cable and the fourth cable retain the second tube light when the second tube light is in the horizontal mode. The set of cables are release, detach and reattach from the first tube light and the second tube light when the first tube light and the second tube light convert between the horizontal mode and a vertical mode.

The suspension cable system include a set of cable retainers which include a first cable retainer retaining the first cable, a second cable retainer retaining the second cable, a third cable retainer retaining the third cable, and fourth cable retainer retaining the fourth cable. The set of cable retainers are height adjustable for adjusting a height of the tube lamps.

The first cable retainer has a first cable retainer opening. The second cable retainer has a second cable retainer opening. The third cable retainer has a third cable retainer opening. The fourth cable retainer has a fourth cable retainer opening.

Figure 1:
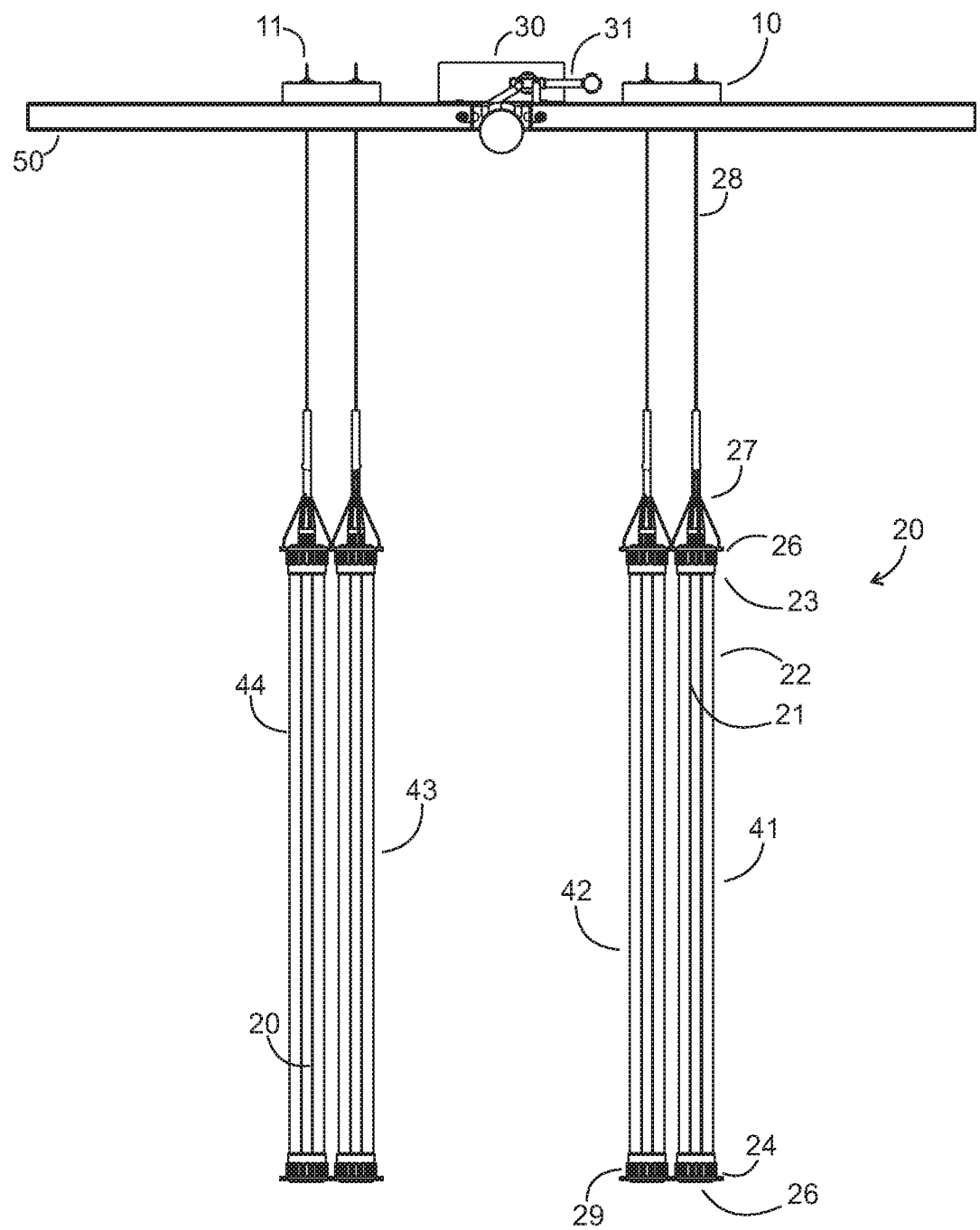
FIG. 1 is a side view of the present invention showing the light tubes in vertical position for growing full-sized plants.

The following callout list of elements can be a useful guide in referencing the element numbers of the drawings.
10 suspension anchor
11 suspension cable connector
20 LED lamp tube
21 LED strip
22 cover
23 upper end
24 lower end
25 lower tube connector
26 upper connector
27 suspension cable
28 power line
29 tube connector bumper
30 power supply
31 mains power line
32 extension plug
33 extension socket
34 first clip
35 second clip
36 third clip
37 fourth clip
38 fifth clip
39 sixth clip
41 first lamp
42 second lamp
43 third lamp
44 fourth lamp
45 seventh clip
50 reflector frame
51 first frame rail
52 second frame rail
53 first reflector
54 second reflector
55 left outside crossbar
56 right outside crossbar
57 left inside crossbar
58 right inside crossbar
59 crossbar slot connector
60 cable retainers
61 first cable retainer
62 second cable retainer
63 third cable retainer
64 fourth cable retainer
65 first cable
66 second cable
67 third cable
68 fourth cable
69 cable retainer opening
71 first folding joint
72 second folding joint
73 first frame rail right section
74 first frame rail left section
75 second frame rail right section
76 second frame rail left section
77 folded mode
78 carry handle
79 pivoted position
80 series of units
81 first unit
82 second unit
83 third unit
84 fourth unit

DETAILED DESCRIPTION OF THE PREFERRED EMBODIMENT

The present invention is a portable convertible grow light that can be configured with one, two, three, or four LED tubes in horizontal or vertical configuration. The frame can be formed as a reflector frame 50 that can be formed in a pair of leafs or halves that fold together. The reflector frame 50 is stored in a folded configuration with the LED tubes clipped onto clips that are mounted to the frame. In the folded configuration, a portion of the frame can be used as a handle. When needed, the frame can be deployed into an unfolded position as seen in the figures. The LED tubes hang from the frame that can be mounted to an external structure such as by hanging. Alternatively, mist or water spray lines can be connected to the reflector frame 50 as well. The LED tubes are preferably watertight to allow use in wet conditions.

As seen in FIG. 1, the suspension anchor 10 supports a suspension cable 27 from a reflector frame 50. A suspension cable connector 11 connects the suspension anchor 10 to the suspension cable 27. The suspension cable 27 supports an LED lamp tube 20. An LED strip 21 is mounted to the LED lamp tube 20 and provides light for plants. The suspension cable 27 can provide support for a power line 28.

The suspension cable 27 is connected to an upper connector 26 at an upper end 23 of the LED tube lamp 20. The LED tube lamp may include a first lamp 41, a second lamp

42, a third lamp 43, and a fourth lamp 44. These lamps can be in vertical or horizontal position. A mains power line 31 connects to a power supply 30 which then supplies power to the power line 28 for the LED tube lamps 20.

Each LED tube lamp 20 has a tubular cover 22 extending from an upper end 23 to a lower end 24. A lower tube connector 25 preferably encapsulates the lower end 24, and an upper connector 26 preferably encapsulates the upper end 23. The suspension cable 27 can be braided with the power line 28. The tubular cover 22 is preferably transparent such as polycarbonate or glass. The upper connector and the lower connector can be formed as elastomeric caps with tube connector bumpers 29. The power supply 30 and mains power line 31 are preferably located on a topside of the reflector frame 50.

Figure 2:
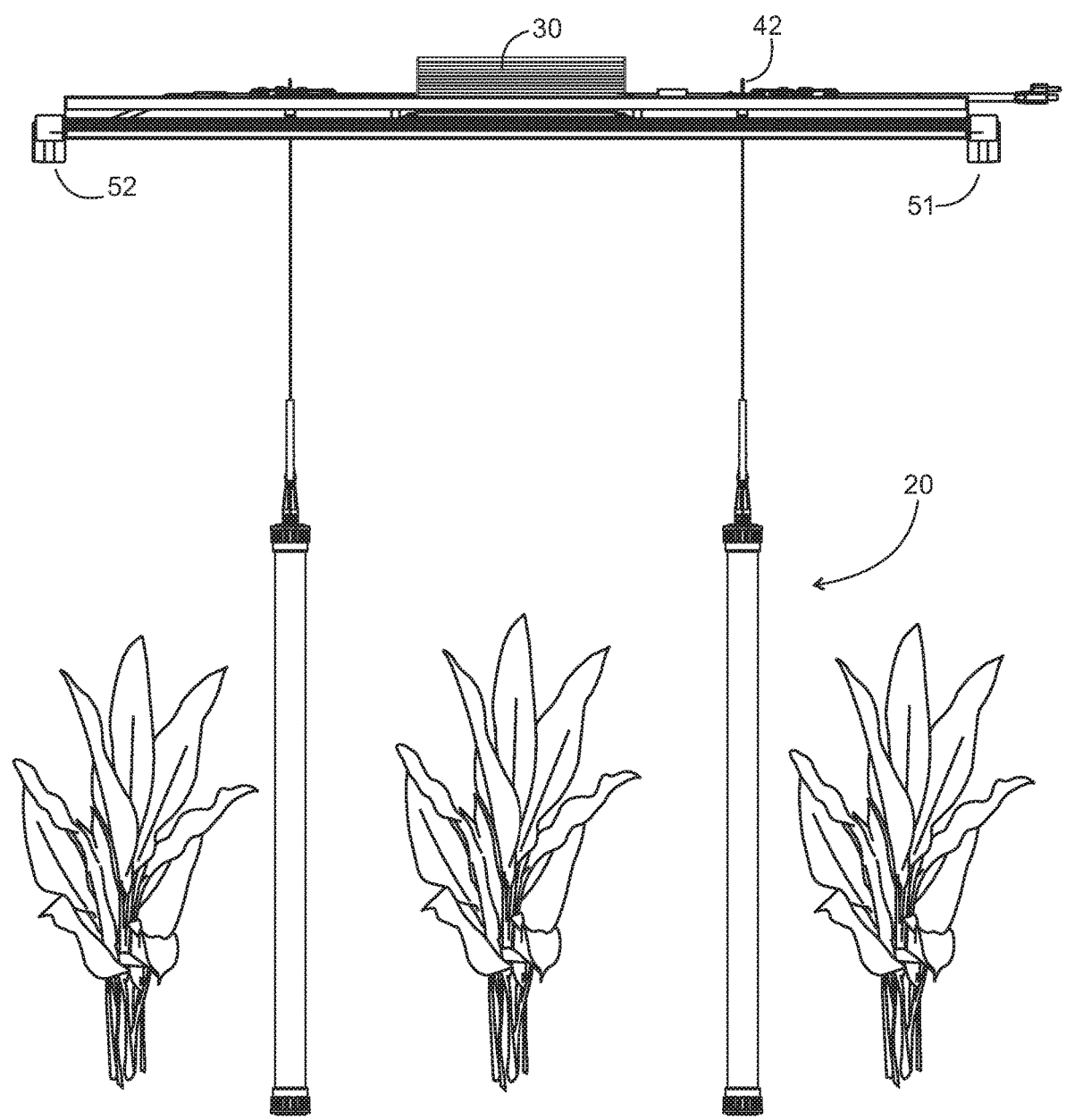
FIG. 2 is a front view of the present invention showing the growing tubes hanging between the plants in vertical position for growing full-sized plants.

As seen in FIG. 2, plants such as plants arranged in pots that are lined up in a row can be placed between the LED lamp tubes 20 that are powered by the power supply 30. The first lamp, and the second lamp 42 can be suspended from a first frame rail 51 and a second frame rail 52 that are on a left and right side of the reflector frame 50. The reflector frame 50 includes a first frame rail 51 and a second frame rail 52 opposite each other.

Figure 3:
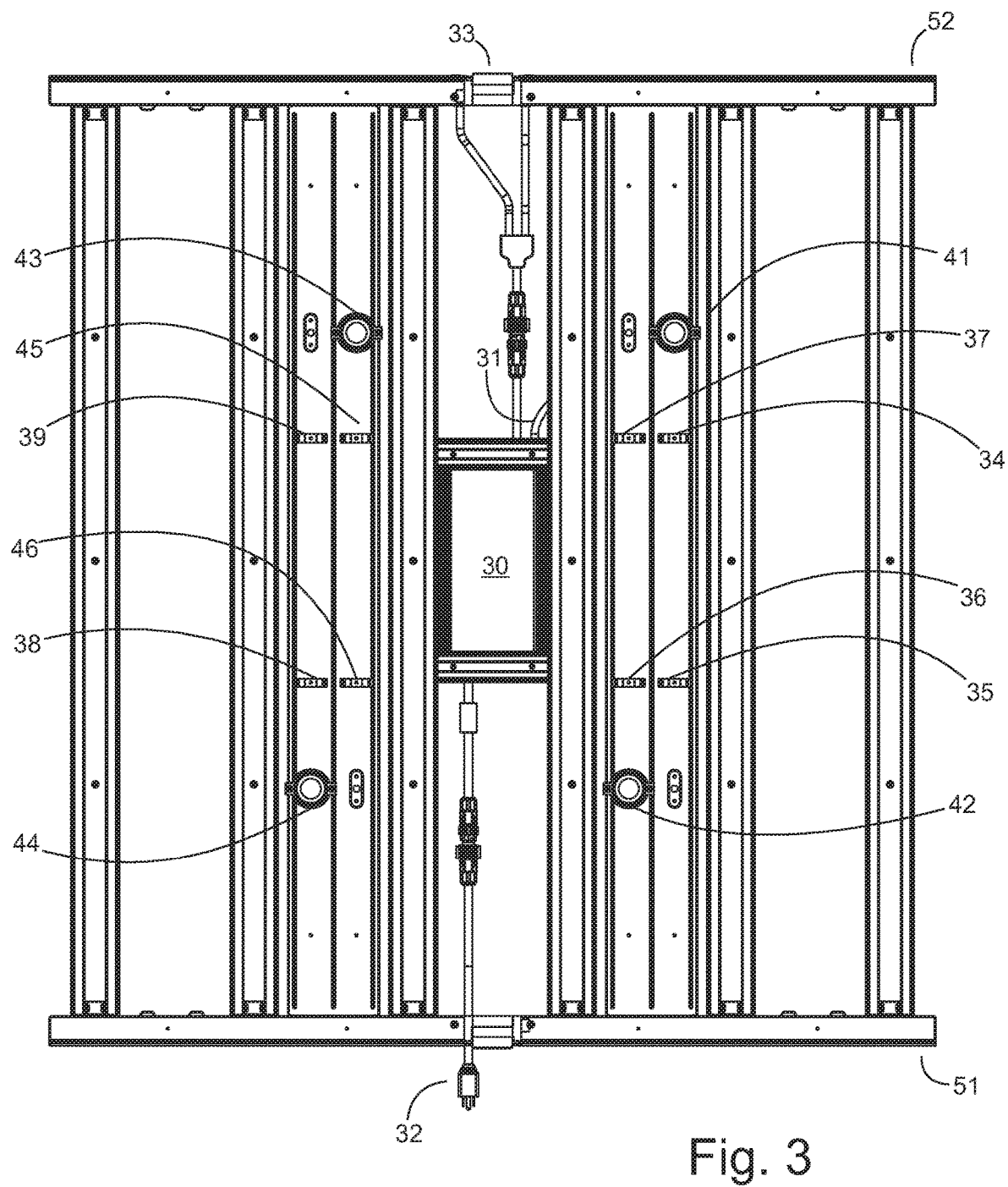
FIG. 3 is a bottom view of the present invention showing the frame and tubes in vertical position.

As seen in FIG. 3, the bottom view shows a reflector surface that reflects a portion of the lamp light downwardly. The power supply 30 is centrally located with mains power line 31 supplying power to the power supply 30, and having an extension plug 32 with an extension socket 33. The extension plug 32 can plug into an extension socket of another grow light unit so that the grow light units can be chained in an array of lights.

When the LED lamp tubes 20 are vertically oriented, and the user is viewing the frame from below, the user can see a first clip 34 for retaining one side of the first lamp 41, a second clip 35 for another end of the first lamp 41 in horizontal position. A third clip 36, and a fourth clip 37 can retain the second lamp 42 in a horizontal position where the second lamp 42 is close to the reflector. The third clip 36 and the fourth clip 37 can retain the second lamp when the apparatus is folded for storing in a stowed position. The fifth clip 38 and the sixth clip 39 retain the fourth lamp 44. The seventh clip 45 and eighth clip 46 retain the third lamp 43. The lamps 20 including the first lamp 41, the second lamp 42, the third lamp 43, and the fourth lamp 44 are perpendicular to the first frame rail 51 and the second frame rail 52.

Figure 4:
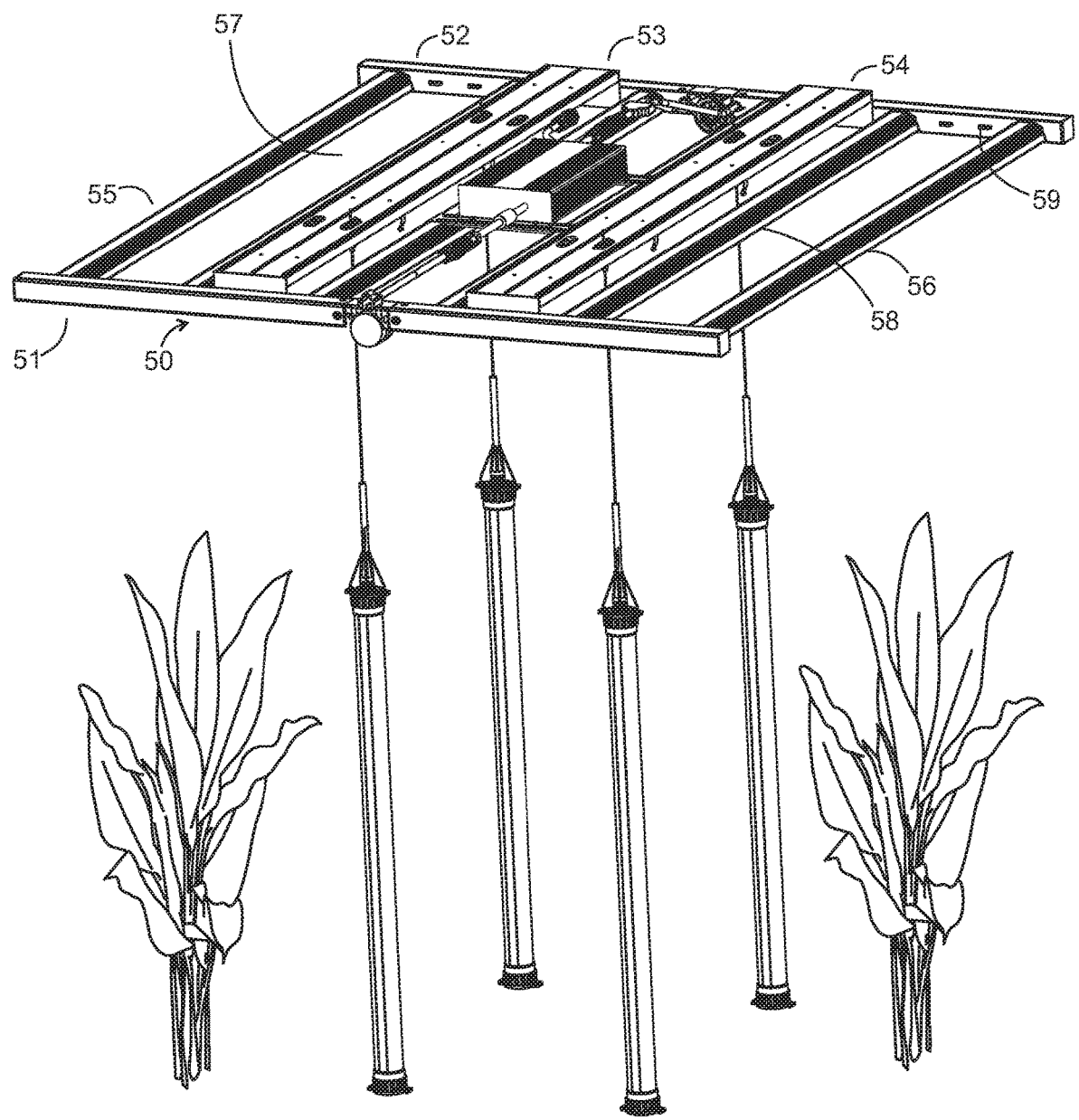
FIG. 4 is a perspective view of the present invention showing the frame rail configuration with the tubes in vertical position.

As seen in FIG. 4, the reflector frame 50 can be constructed in a frame structure having a first frame rail 51 and a second frame rail 52 parallel to each other and spaced apart. The first reflector 53 and a second reflector 54 can span between the first frame rail 51 and the second frame rail 52. The first frame rail 51, and the second frame rail 52 can be made of extruded aluminum, or bent sheet metal. The first reflector 53 and the second reflector 54 can be made of reflective stainless steel or other reflective metal. The left outside crossbar 55 and the right outside crossbar 56 connect the first frame rail 51 to the second frame rail 52. The left inside crossbar 57 and the right inside crossbar 58 are preferably parallel to the left outside crossbar 55 and a right outside crossbar 56. The crossbars can be connected to the first frame rail 51 and the second frame rail 52 at crossbar slot connectors 59. The crossbar slot connectors can be slots that receive tabs formed on ends of the crossbars.

Figure 5:
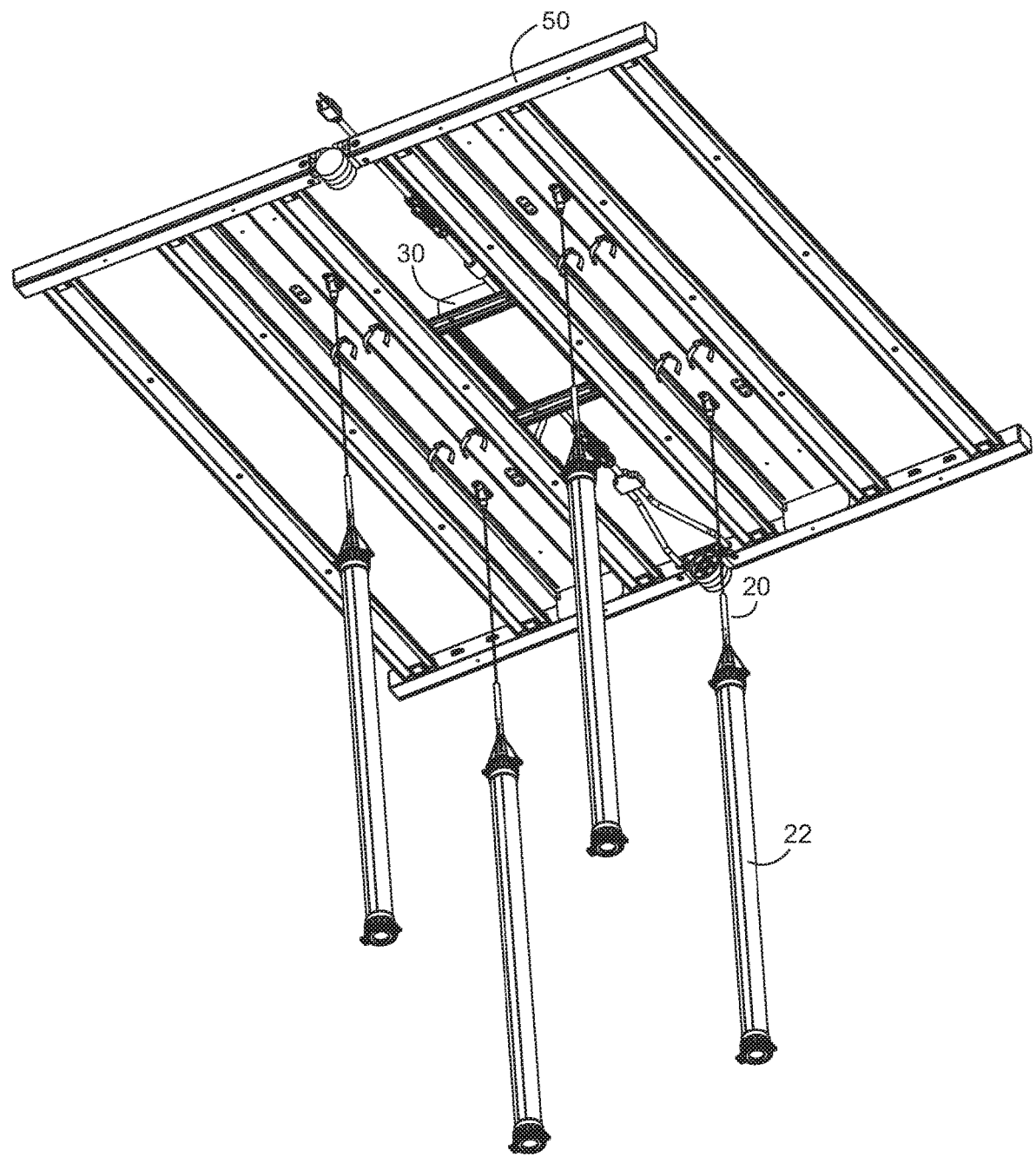
FIG. 5 is a bottom view of the present invention showing the light tubes in vertical configuration for growing full-sized plans.

As seen in FIG. 5, the tube lights can hang vertically from the frame.

Figure 6:
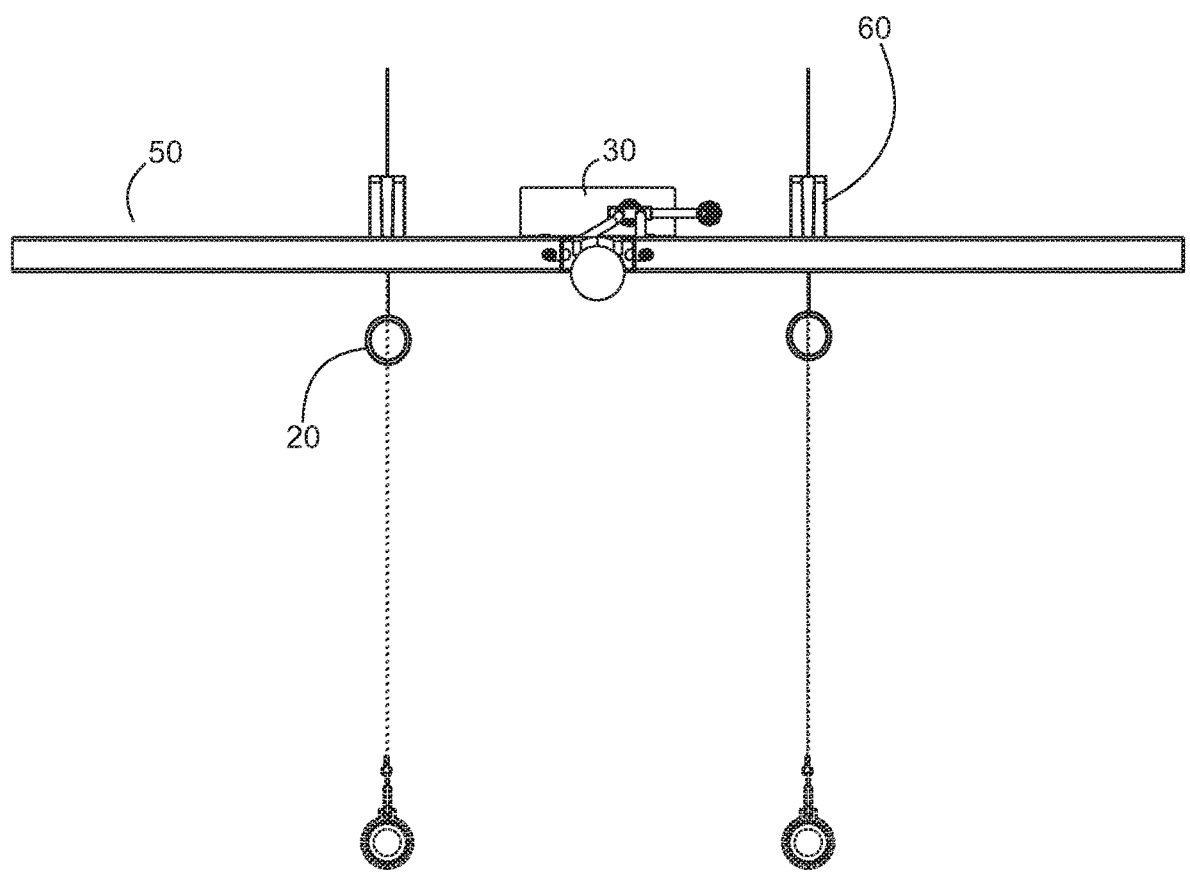
FIG. 6 is a side view of the present invention showing the light tubes in horizontal position, for growing seedlings.

As seen in FIG. 6, the frame can adjust the height of the tube lights when the tube lights are in horizontal position.

Figure 7:
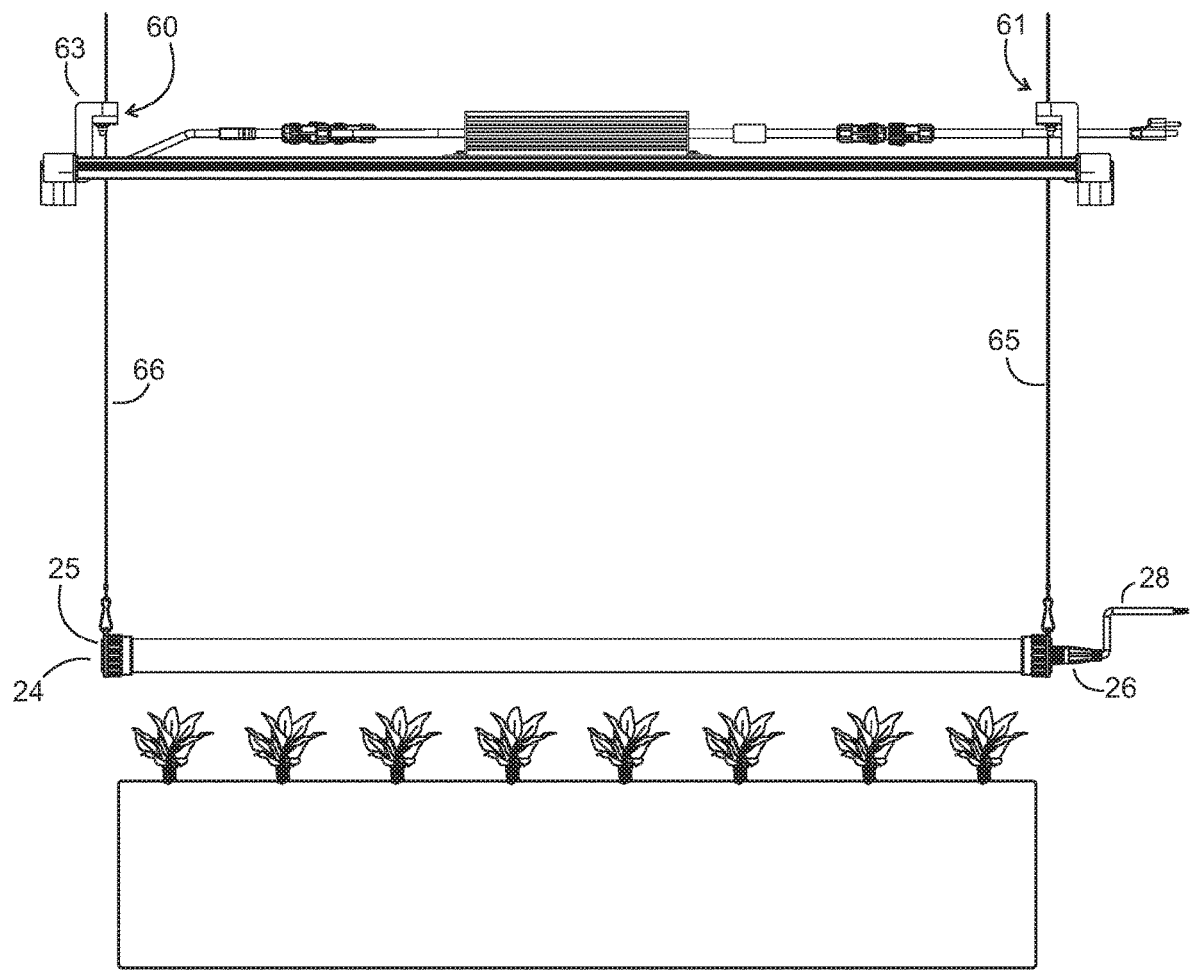
FIG. 7 is another side view of the present invention showing the light tubes in horizontal position for growing seedlings.

As seen in FIG. 7, the tube lights can be horizontal and lowered for seedlings.

Figure 8:
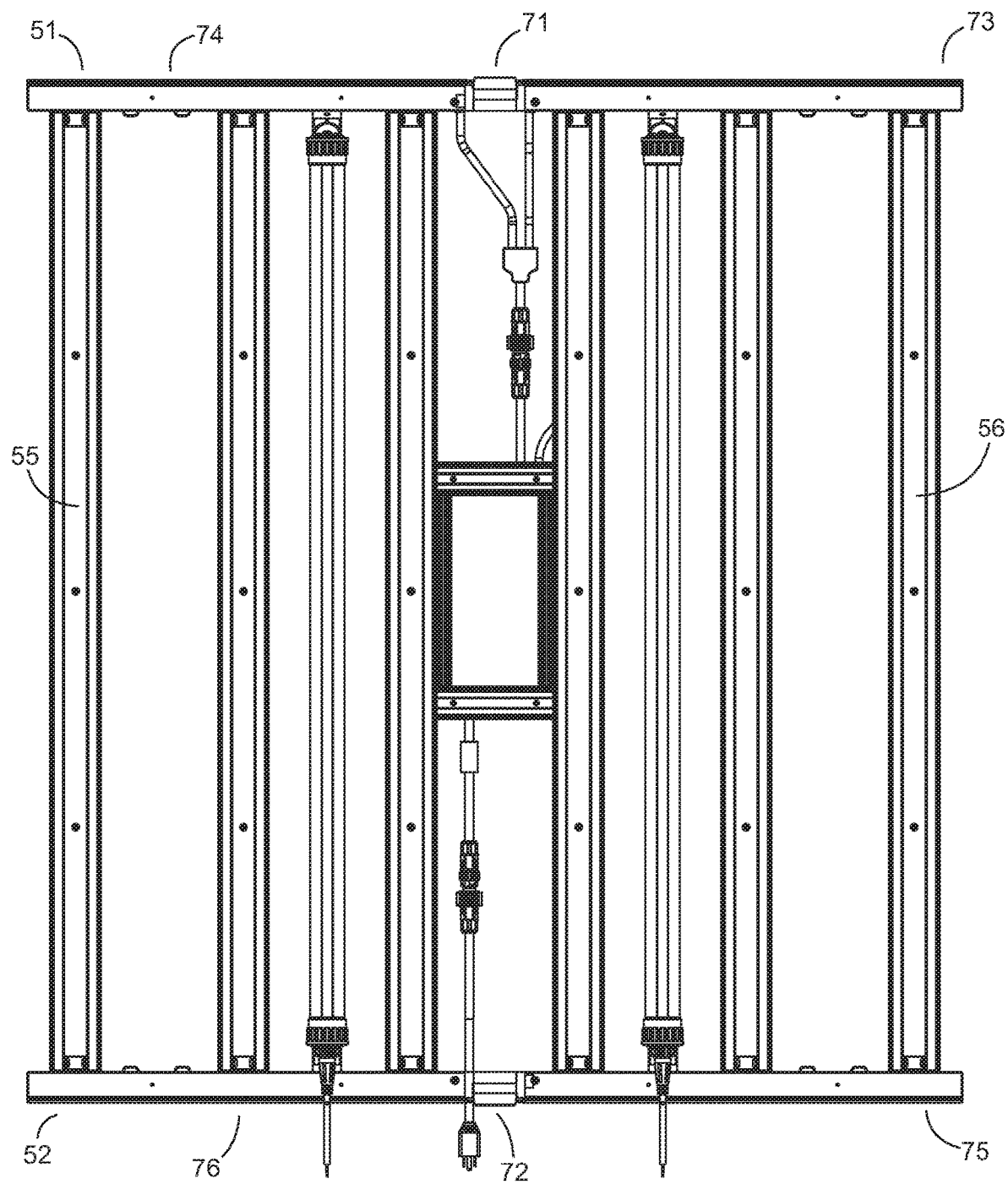
FIG. 8 is a bottom view of the present invention showing the light tubes in a horizontal position for growing seedlings.

As seen in FIG. 8, the first frame rail 51 can fold at a first folding joint 71, and the second frame rail 52 can fold at a second folding joint 72. The left outside crossbar 55 and the right outside crossbar 56 can fold together to form a carry handle. The first frame rail right section 73 is hinged to the first frame rail left section 74 at the first folding joint 71. The second frame rail right section 75 is hinged to the second frame rail left section 76 at the second folding joint 72. When the frame structure folds, it forms an elongated briefcase shape.

Figure 9:
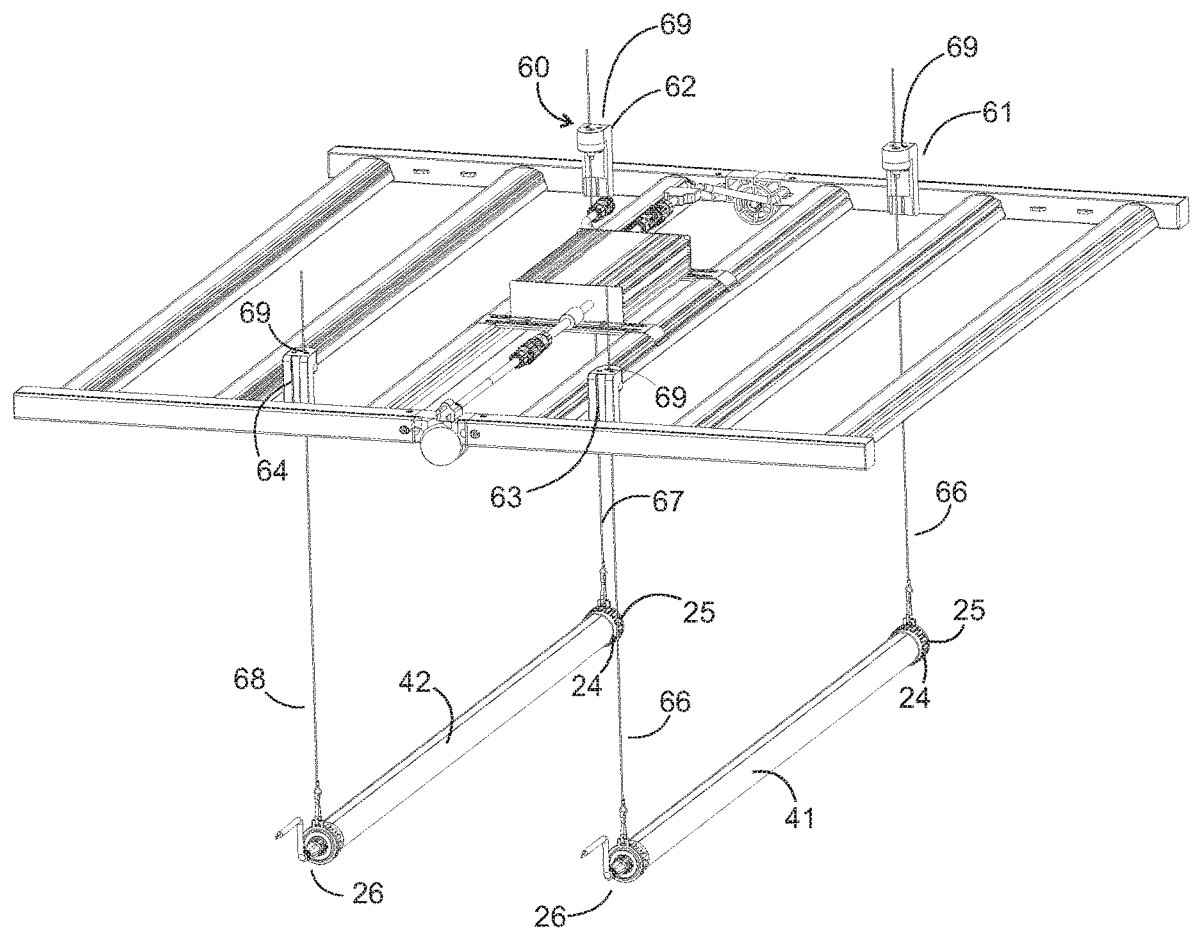
FIG. 9 is a perspective view of the present invention showing the frame and tubes in horizontal position for growing seedlings.

As seen in FIG. 9, the upper connector 26 connects power to the lamps. The lower end of the lamps 20 can be rotated upwardly so that the lamps 20 are in a horizontal position. The first cable 65 and the second cable 66 suspend a first lamp. The third cable 67 and the fourth cable 68 suspend the second lamp. Lamps can be moved or added as necessary in this configuration. The configuration as seen in FIG. 9 has two lamps.

The cable retainers 60 retain the cables. A first cable retainer 61 retains a first cable. A second cable retainer 62 retains a second cable. A third cable retainer 63 retains a third cable. A fourth cable retainer 64 retains a fourth cable. Each of the cable retainers have a cable retainer opening 69 that can lock or latch to secure the cables in a locked position. The cable retainers allow movable and height adjustment to adjust a height of the lamp.

The repositioning capability of the lamp structure allows a single lamp structure for growing seedlings and for growing plants. A key feature of the present invention is the capability to rotate the tubular lamp from a horizontal mode to a vertical mode. Conversion from the horizontal mode to the vertical mode requires a user to detach the lower tube connector 25 as from the first cable 65 so that the lower end 24 is detached from the first cable 65 and free from the first cable 65. A clip at the end of the first cable 65 can attach to an eyelet formed on the lower end 24. When the clip is detached, the lower tube connector 25 is free to complete the rotation.

Some plants can grow quickly in hydroponic conditions. Some tomato plants may be 40 cm high after one month, and 100 cm high after 2 months. Tomato harvesting can be between 3 months and 4 months, so the horizontal position could be used for the first 2 months, and then the vertical position could be used for the next 2 months after that depending on the plant growth. Some plants do not require as many lamps, so the present invention allows modular removal of those lamps.

The cable retainers 61 allow height adjustment, so that present invention can simultaneously grow and mature plants and seedlings. The mature plants can receive light from the vertical lamp on a right half of the portable grow light fixture, and the seedlings can receive light from the horizontal oriented lamp tube of the fixture.

When the fixture is made in standard size, it can be inserted into a T track drop ceiling frame more easily than prior art fixtures because it can partially fold for insertion into a rectangular or square space such as a 2×2 space, and then unfold to install. Thus, the portable grow light can also be used as a standard light fixture having horizontal LED tubular lamps.

Figure 10:
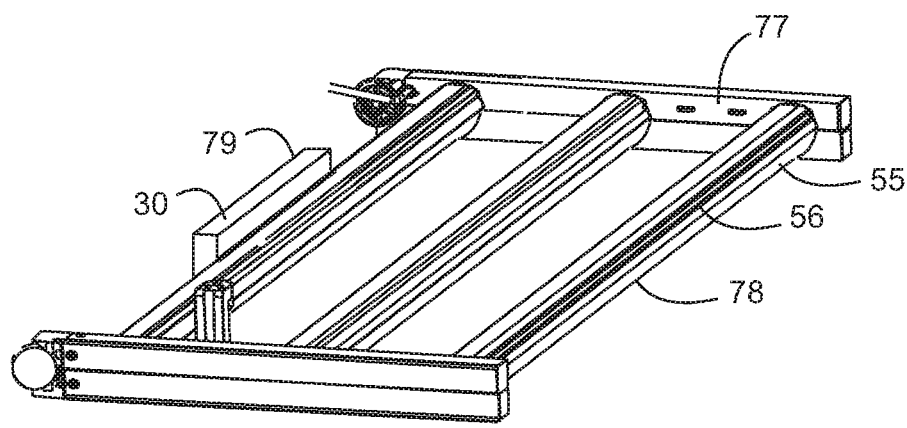
FIG. 10 is diagram showing folding.

FIG. 10 is a diagram showing folded mode 77. The left outside crossbar 55 and the right outside crossbar 56 can fold together to form a carry handle 78. The power supply 30 can be mounted on a pair of it so that it can be pivoted to a pivoted position 79 when the frame is folded to a folded position in the folded mode 77.

Figure 11:
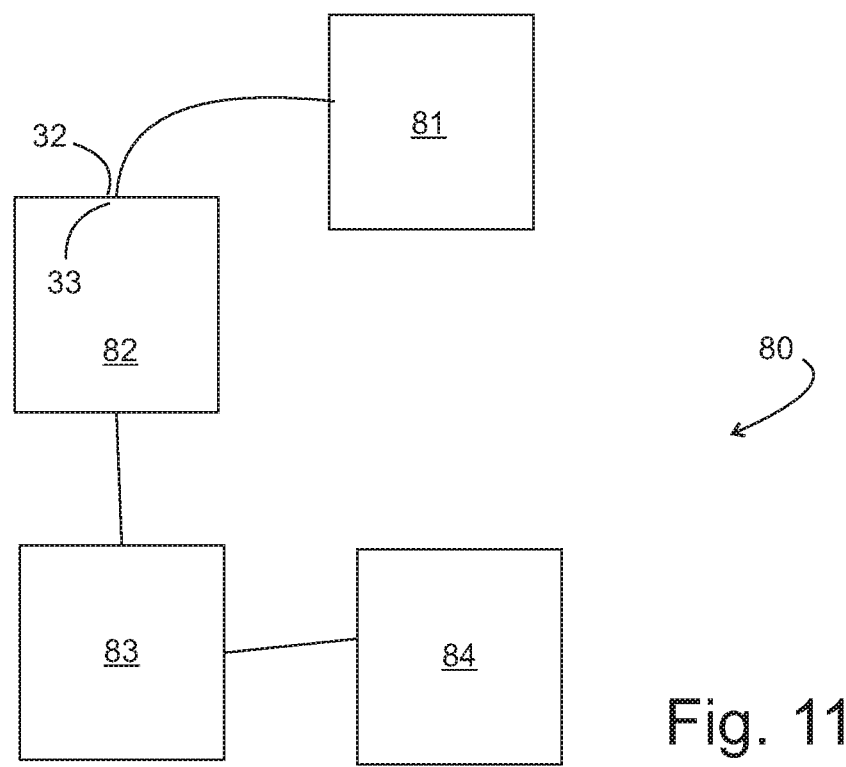
FIG. 11 is diagram showing connection in series.

FIG. 11 is a diagram showing series connection in a series of units 80. A first unit 81 can connect to a second unit 82, which can connect to a third unit 83 which can connect to a fourth unit 84 when the extension plugs 32 connect to the extension sockets 33. Each unit has an extension plug and an extension socket. Each of the units can fold for storage as seen in FIG. 10.

The invention claimed is:

1. A grow light comprising:
   a. a frame, wherein the frame includes a first frame rail and a second frame rail, wherein the frame includes a first reflector, wherein the first reflector extends from the first frame rail to the second frame rail;
   b. tube lights extending from the frame, wherein the tube lights are elongated, wherein the tube lights have a vertical mode and a horizontal mode, wherein the tube lights include a first tube light and a second tube light;
   c. a power supply mounted to the frame between the first frame rail and the second frame rail, and a mains power line connecting to the power supply; and
   d. a suspension cable system, wherein the suspension cable system is mounted to the frame at a suspension anchor, and mounted to an upper end of the first tube light at an upper connector, wherein the tube lights have a lower end that is free when in vertical mode.

2. The grow light of claim 1, wherein the frame further includes a second reflector, wherein the second reflector extends from the first frame rail to the second frame rail.

3. The grow light of claim 2, wherein the frame further includes a right outside crossbar extending from the first frame rail to the second frame rail, and wherein the frame further includes a left outside crossbar extending from the first frame rail to the second frame rail.

4. The grow light of claim 1, wherein the first frame rail folds at a first folding joint, and wherein the second frame rail folds at a second folding joint, wherein clips mounted to the frame retain the tube lights.

5. The grow light of claim 1, further including an extension socket mounted on the frame, and an extension plug extending from the power supply, wherein the extension plug is configured to connect to an external extension socket.

6. A grow light comprising:
   a. a frame, wherein the frame includes a first frame rail and a second frame rail, wherein the frame includes a first reflector, wherein the first reflector extends from the first frame rail to the second frame rail, wherein the frame further includes a second reflector, wherein the second reflector extends from the first frame rail to the second frame rail, wherein the frame further includes a right outside crossbar extending from the first frame rail to the second frame rail, and wherein the frame further includes a left outside crossbar extending from the first frame rail to the second frame rail;
   b. tube lights extending from the frame, wherein the tube lights are elongated, wherein the tube lights have a vertical mode and a horizontal mode, wherein the tube lights include a first tube light and a second tube light;
   c. a power supply mounted to the frame between the first frame rail and the second frame rail, and a mains power line connecting to the power supply;
   d. a suspension cable system, wherein the suspension cable system is mounted to the frame at a suspension anchor, and mounted to an upper end of the first tube light at an upper connector, wherein the tube lights have a lower end that is free when in vertical mode; and
   e. a first folding joint, and a second folding joint, wherein the first frame rail folds at a first folding joint, and wherein the second frame rail folds at a second folding joint, wherein clips mounted to the frame retain the tube lights.

7. The grow light of claim 6, wherein the first tube light is mounted underneath the first reflector, wherein the second tube light is mounted underneath the first reflector, and further including a third tube light mounted underneath the second reflector, and further including a fourth tube light mounted underneath the second reflector.

8. The grow light of claim 6, wherein the suspension cable system includes set of cables including a first cable, second cable, third cable, and fourth cable, wherein the first cable and the second cable retain the first tube light when the first tube light is in the horizontal mode, wherein the third cable and the fourth cable retain the second tube light when the second tube light is in the horizontal mode, wherein the set of cables are release and detachable from the first tube light and the second tube light when the first tube light and the second tube light convert between the horizontal mode and a vertical mode.

9. The grow light of claim 8, wherein the suspension cable system includes a set of cable retainers which include a first cable retainer retaining the first cable, a second cable retainer retaining the second cable, a third cable retainer retaining the third cable, and fourth cable retainer retaining the fourth cable, wherein the set of cable retainers are height adjustable.

10. The grow light of claim 9, wherein the wherein the first cable retainer has a first cable retainer opening, wherein the second cable retainer has a second cable retainer opening, wherein the third cable retainer has a third cable retainer opening, wherein the fourth cable retainer has a fourth cable retainer opening.

* * * * *